United States Patent [19]

Piatt et al.

[11] Patent Number: 4,709,247

[45] Date of Patent: Nov. 24, 1987

[54] HIGH RESOLUTION, PRINT/CARTRIDGE INK, JET PRINTER

[75] Inventors: Michael J. Piatt, Enon; Kevin L. Houser, Kettering, both of Ohio

[73] Assignee: Eastman Kodak Company, Rochester, N.Y.

[21] Appl. No.: 945,133

[22] Filed: Dec. 22, 1986

[51] Int. Cl.[4] .............................................. G01D 15/16

[52] U.S. Cl. ................................ 346/140 R; 400/126; 400/175

[58] Field of Search .................... 346/140, 139 C, 145; 400/126, 175

[56] References Cited

U.S. PATENT DOCUMENTS

| | | | |
|---|---|---|---|
| 4,364,067 | 12/1982 | Koto | 346/140 |
| 4,500,895 | 2/1985 | Buck | 346/140 |
| 4,544,931 | 10/1985 | Watanabe et al. | 346/140 R |
| 4,571,599 | 2/1986 | Rezanka | 346/140 R |
| 4,628,334 | 12/1986 | Dagna | 346/140 |

*Primary Examiner*—Joseph W. Hartary
*Attorney, Agent, or Firm*—John D. Husser

[57] ABSTRACT

A high resolution ink jet printing system includes a plurality of substantially identical print/cartridges each having an orifice plate comprising: (i) an array of orifices located in a precisely interspaced relation and (ii) a detent means precisely located with respect to the orifice array. The system provides a carriage for insertably supporting such print/cartridges and for traversing them along a linear print zone in a direction substantially perpendicular to the direction of print medium feed. The carriage has reference surfaces for respectively positioning the detent means of inserted print/cartridges at predetermined locations that are precisely vertically offset relative to the direction of carriage traverse. In such system the printing droplets from the vertically offset orifice arrays of inserted and indexed print/cartridges will be vertically interlaced in each printing traverse of the carriage.

20 Claims, 19 Drawing Figures

HIGH RESOLUTION, PRINT/CARTRIDGE INK, JET PRINTER

BACKGROUND OF THE INVENTION

1. Field of the Invention

The present invention relates to ink jet printing apparatus of the type using insertable print/cartridges and more specifically to printer interface constructions for high resolution printing with such print/cartridges.

2. Description of Background Art

There are known drop-on-demand ink jet printer systems in which a print head carriage bearing a print head traverses across the width of a print medium in a line printing operation. Between line printing sequences, the print medium is advanced to prepare for the next sequence. One useful approach for such printing systems is to construct the print head element as part of a disposable print/cartridge which contains an ink supply, drop-generating structures and electrical connections adapted for coupling to the printer, which provides drop-generating energy to such an inserted print/cartridge.

Heretofore, such insertable print/cartridges have been used one unit at a time in the printer and the resolution of the printing output has been dictated by the interspacing of orifices in the print/cartridge, e.g. 12 orifices per vertical character dimension. As described in U.S. patent application Ser. No. 855,302, entitled "Double Pass Printing in Dot Matrix Printer," filed Apr. 24, 1986, in the name of M. J. Piatt, the resolution of print output from such printers can be effectively doubled by employing a retrace line-print mode wherein the print media is advanced by one-half the vertical dot spacing after a first line printing pass. During return traverse of the carriage, a print output, e.g. of the 12 orifices, is interlaced between the forward line-print output so that the vertical resolution attained is doubled, e.g. to 24 pixels per nominal vertical character height. While this print output is quite adequate for producing highly legible text, it would be desirable for some applications, e.g. the printing of graphics ahd high quality text, to have the capability of a higher resolution of the orifices. Alternatively, such capability can be used to increase the overall output speed of the printer, i.e. allowing the printer to print a successive line of text during the retrace of the print carriage, rather than interlace.

There are several approaches which can be pursued to increase effective resolution of such print/cartridge printers. First, the resolution and number of the orifices in a print/cartridge can be increased, e.g. from 12 per character height to 24 or 48 per character height. Such orifice and drop generator densities present a difficult fabrication problem, particularly for print/cartridges that would be disposable after the ink supply is empty. In a second approach, more interlacing line retraces can be utilized, or a combination of line retracing and increased orifice density can be employed. However, line retracing itself is not without disadvantages and difficulties. Line retracing occurs at the cost of decreased throughput rate. Also, at high resolutions, it becomes more difficult to achieve the requisite accuracy of media advance for proper vertical alignment of the interlacing ink drops.

SUMMARY OF INVENTION

One significant purpose of the present invention is to provide a new and advantageous approach for attaining higher printing resolutions in print/cartridge ink jet printing apparatus such as described above. In general, this approach employs printer interface constructions that physically position and electrically control a plurality of print/cartridges to print cooperatively in an interlacing mode. This increases output resolution, without misalignment artifacts and without the decreases of printer speed that are connected with retrace print approaches.

One important advantage of the present invention is that it facilitates printing resolution improvements in print/cartridge printers without increasing manufacturing complexities and costs for the print/cartridges.

In one aspect the present invention constitutes a high resolution ink jet printer for utilizing a plurality of insertable print/cartridges, each having (i) an orifice plate comprising orifices spaced in a linear array, (ii) an ink reservoir for supplying ink to such orifices and (iii) a plurality of drop generators respectively aligned with such orifices. The printer includes means for advancing a print medium through a linear print zone and a carriage that is constructed to move across the print zone in a traversing direction and insertably receive a plurality of such print/cartridges in a transversely spaced relation. The carriage includes means for indexing the orifice arrays of received print/cartridges to be precisely perpendicular to the direction of carriage traverse and in a precise, vertically interlaced relation, based on the direction of carriage traverse. The printer desirably includes means for detecting relative transverse locations of indexed print/cartridges and means for controlling the printing actuations of print/cartridges in accordance with their relative transverse locations.

BRIEF DESCRIPTION OF DRAWINGS

The subsequent description of preferred embodiments refers to the attached drawings wherein.

DETAILED DESCRIPTION OF PREFERRED EMBODIMENTS

Figure 1:
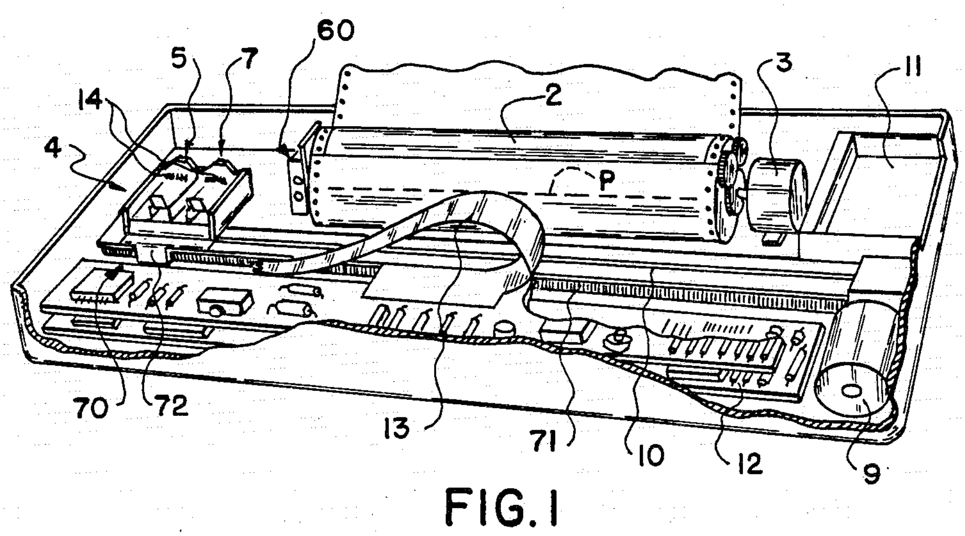
FIG. 1 is a perspective view, with cover portions removed, of one preferred printer embodiment in accord with the present invention.

The ink jet printing apparatus shown in FIG. 1 in general comprises a print medium advancing platen 2 which is adapted to receive sheet or continuous print material, e.g. paper, from an ingress at the lower rear, and under the drive from motor 3, advance successive line portions of the medium past a print zone P, and out of the printer through a printer egress in the top of the printer. During the passage of successive line portions through the print zone, multi print/cartridge carriage 4 is traversed across the print zone so that print/cartridges placed in the two individual carriage nests 5 and 7 can effect printing operations, as subsequently described. The carriage 4 is slidingly mounted on a guide rail means 35 (see FIGS. 3, 4A and 4B) located beneath the print/cartridge support nests 5 and 7 and a carriage drive motor 9 effects traversing movement of the carriage 4, past the platen face, via an endless cable 10 attached to carriage 4. The printer is electrically energized, e.g. from a battery or transformer located at 11, via a control circuit means 12. Electrical energy is supplied to individual print/cartridges by means of ribbon cables 13 which have terminals 14 in the lower portion of each of support nests 5 and 7.

Figure 2:
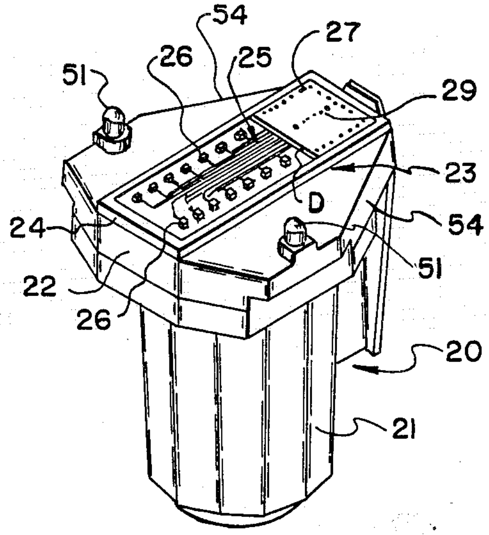
FIG. 2 is a perspective view of one embodiment of disposable print/cartridge which is useful in accord with the present invention.

Referring now to FIG. 2, there is shown one useful print/cartridge embodiment 20, which is adapted to be removably inserted into an operative relation with the printer via carriage 4. The print/cartridge 20 is adapted to be disposable when empty of ink and in general comprises an ink supply reservoir 21 and cover member 22, which covers the ink reservoir and, together with position lugs 51, coarsely positions the print head assembly 23 in nests 5 and 7. The print head assembly 23 is mounted on the cover member and comprises a driver plate 24 having a plural of electrical leads 25 formed thereon. The leads 25 extend from connector pads 26 to resistive heater elements (not shown) located beneath each orifice 29 of a linear orifice array formed in orifice plate 27. Ink from reservoir 21 is supplied through cover member 22 to a location beneath each orifice 29 of plate 27 (and above the heater element for that orifice). Upon application of an electrical print pulse to a terminal pad by the printer control, the corresponding resistive heater element causes an ink vaporization condition which ejects a printing ink droplet from its corresponding orifice 29. The orifice plate 27 can be electroformed using photofabrication techniques to provide precisely located orifices and is attached to driver plate 23, which is in turn affixed to the cover member 22. Thus it will be appreciated that even though the linear array of orifices 29 is precisely located within the orifice plate 27, its position vis-a-vis the locating portions of cover member 22 and positioning lugs 51 is not precisely consistent, e.g. in the vertical or horizontal directions, for different disposable print/cartridges. Print/cartridges of the type just described are known in the art for use in single print/cartridge printers, and the coarse locating structures are adequate for those applications.

Figure 3:
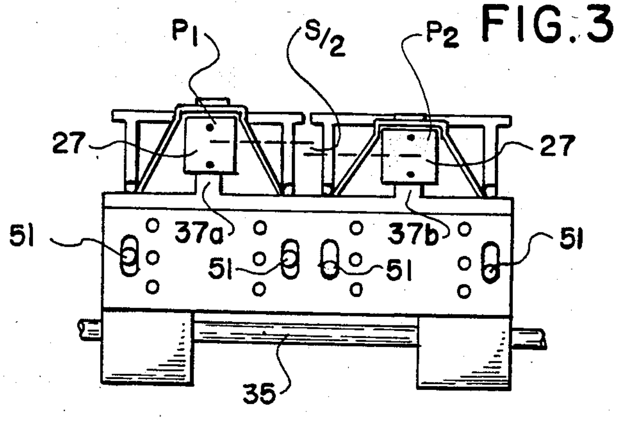
FIG. 3 is a view of the print/cartridge carriage of the FIG. 1 printer embodiment, as viewed from the print zone side of the apparatus.
Figure 4A:
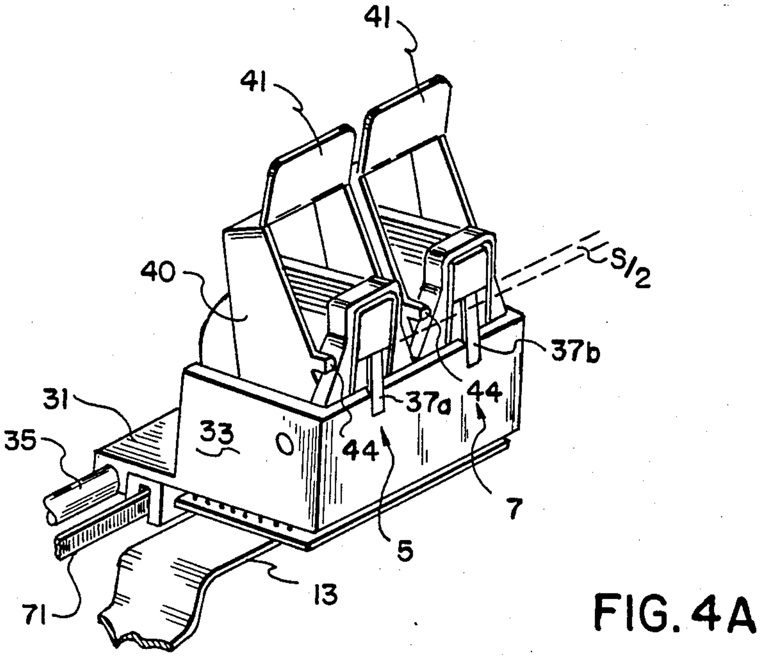
FIGS. 4 and 4B are respectively a perspective and a side view, partially in cross section, of the print/cartridge carriage shown in FIGS. 1 and 3.
Figure 4B:
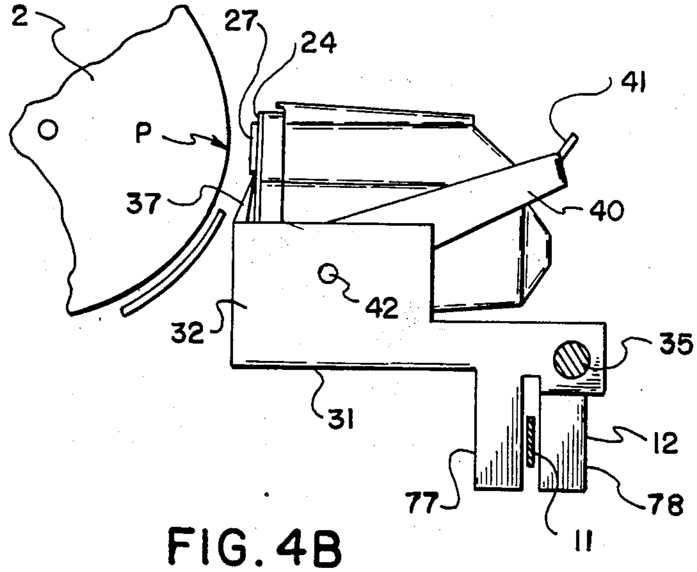

Referring now to FIGS. 3, 4A and 4B, the print/cartridge carriage 4 comprises a bottom wall portion 31, a front wall portion 32 and side wall portions 33 which together form the plurality of print/cartridge nests 5 and 7 that are adapted to receive and coarsely position print/cartridges with respect to the printing zone P of the printer. The bottom of wall portion 31 is mounted on guide rail means 35 for traversing the carriage across the print zone P in a precisely uniform spacial relation to the platen 2 and in a direction substantially parallel to the axis of that platen's axis of rotation. Thus, the direction of the carriage traverse is substantially orthogonal to the direction of print medium advance.

Figure 5:
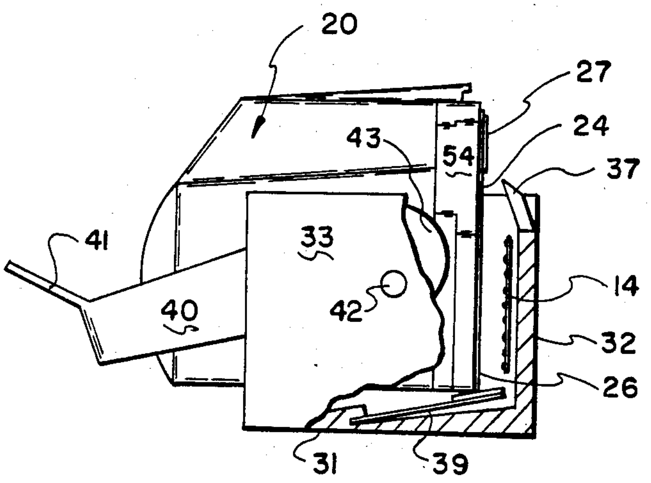
FIGS. 5–8 are views showing various stages of the print/cartridge positioning sequence.
Figure 6:
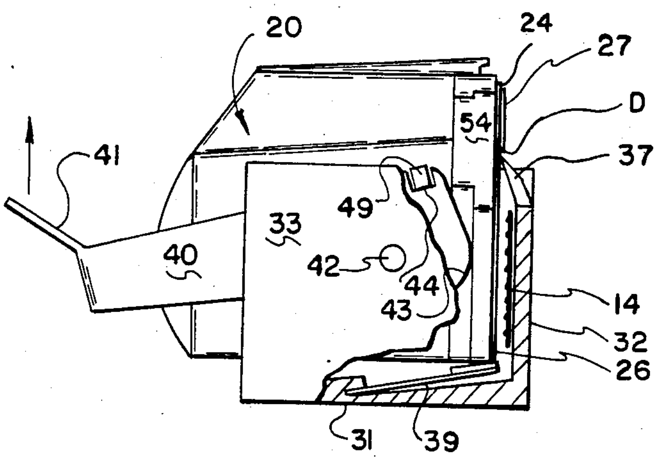
Figure 7A:
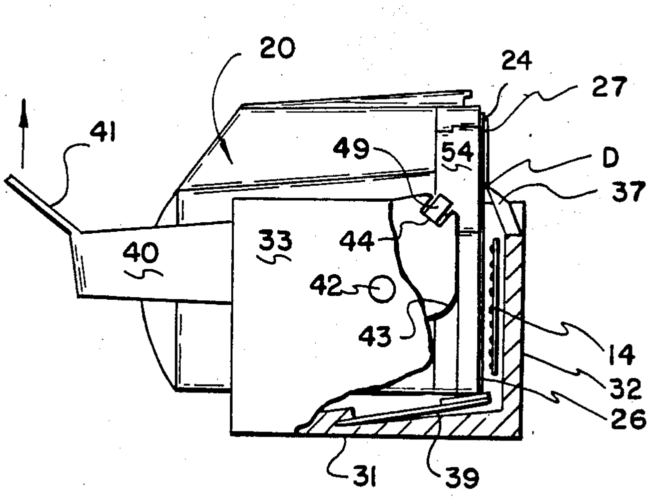
Figure 7B:
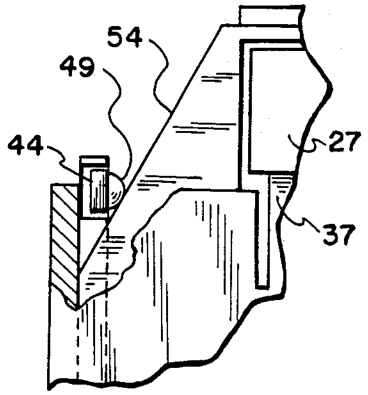

The tops of the front walls 32 of the print/cartridge nest 5 and 7, have respectively, as an upper extension, knife portions 37*a* and 37*b*, which form reference edges that are precisely parallel to the direction of carriage translation and equidistantly spaced from the linear print zone P. Mounted on the side walls 33 of the carriage nests 5 and 7 are fastening means 40 for contacting print/cartridges, which have been inserted into nests, and moving such print/cartridges into precise operating position in the printer apparatus. Referring to FIG. 5, it can be seen that the fastening means 40 comprises lever arm portions 41, hinge portions 42, camming portions 43 and seating arm portions 44. The bottom wall 31 of each nest 5 and 7 also comprises a resilient portion 39 and the fastening means is adapted to move the bottom of an inserted print/cartridge into a forced engagement that downwardly compresses resilient portion 39, when the lever arm portion 41 is moved upwardly to the position shown in FIGS. 3, 4A and 4B. When lever arm portion 41 is moved downward, the fastening means 40 is disengaged and the print/cartridge 20 can be hand-lifted from its nest in the carriage 4.

Referring now to FIG. 2, as well as FIGS. 3–8, the orifice plate vertical positioning system is designed to provide a predetermined sequence of engagements between the print/cartridges 20 and the carriage 4. First, the print/cartridges are hand-inserted into a coarsely positioned alignment resting loosely in a nest on top of cantilever spring 39 (see FIG. 5). As shown in FIG. 3, positioning lugs 51 of the print/cartridges are located in vertical slots 53. As the fastening means 40 is rotated clockwise (as viewed in FIGS. 5, 6, 7A and 8), the cam portion 43 first urges the smooth top surface of the driver plates 24 into forced contact with knife edges 37*a* and 37*b* (see FIG. 6). At this stage the cam dimples 49 on seating arm portions 44 have not yet contacted the print/cartridge sidewalls. During continued rotation the cam dimples 49 contact shoulder portions 54 of the inserted print/cartridges 20 and move the print/cartridges downwardly against the bias of resilient means 39, while cam portions 43 maintain the forward force urging the driver plates 24 into contact with knife edges 37*a* and 37*b*. During this downward movement, the knife edges 37*a* and 37*b* will slide along the face of the respective driver plates 24 until detent surfaces D of the print/cartridges engage their knife edge (see FIG. 7A). In the embodiment shown in FIGS. 2–8, the detent D comprises a lower edge portion of the orifice plate 27. As the engagement between the knife edges and the detent edges D evolves, the print/cartridges are oriented within the nest so that the detent edges D are precisely parallel to the knife edges. Because the orifice arrays 29 and the detent edges D of the orifice plates 27 are photofabricated, they can be precisely located relative to one another in an economical fashion. Thus precise positioning of the orifice plate's detent edge D relative to the knife edge of each carriage nest precisely locates the printing orifices (rotationally and vertically) relative to the the tranversing path of the printer carriage 4, as well as in a predetermined spacial relation vis-a-vis the print zone P.

Figure 8:
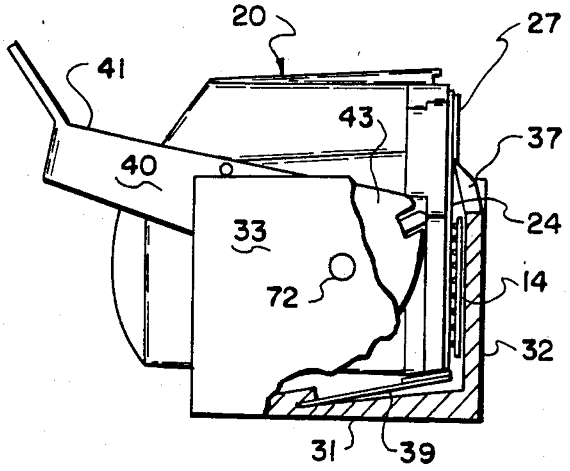

Continued movement of the lever arm 41 causes cam surfaces 43 to move connector pads 26 of the print/cartridges into contact with the terminals 14 in the nest bottoms (see FIG. 8). To allow continued movement of the fasten means 40, after full detenting of the orifice plate, the seating arms 44 are slightly flexible in an outward direction (see FIG. 7B) to allow dimples 49 to slip down the sides of shoulders 54. As shown best in FIG. 7B, the thickness of cantilever seating arm 44 behind dimple 49 is less than the other portions of the fastening means 40 to allow this outward movement. The particular print/cartridge positioning structure just described is the subject of U.S. application Ser. No. 945,134, entitled "Multiple Print/Cartridge Ink Jet Printer Having Accurate Vertical Interpositioning" by Piatt, Houser and McWilliams, which is incorporated herein by reference for that teaching.

In accordance with the present invention, the knife edges 37*a* and 37*b* of the print/cartridge nest 5 and 7 are carefully aligned to be mutually parallel with a uniform spacing from the print zone P and to be precisely parallel to the traversing direction of the carriage, which in turn is approximately orthogonal to the direction of print media advance. In addition, as best shown in FIGS. 3 and 4B, the knife edges have a predetermined vertical offset S/2 therebetween. More specifically, the referencing surface of knife edge 37*b* is located a distance of one-half of the center-to-center spacing of the orifices (i.e. S/2) below (i.e. vertically downward in the direction of the linear orifice array of a position print-/cartridge) from the referencing surface of the adjacent knife edge 37*a*. In this manner, the orifices of print/cartridge $P_2$ indexed by knife edge 37*b* will be physically "vertically interlaced" to supply printing droplets at the midpoints between the printing droplets supplied by print/cartridge $P_1$, as indexed by knife edge 37*a*. Because of the photofabrication techniques employed in fabricating orifice plate 27, the location of orifices 29, relative to the detent edge D, is accurately the same for each print/cartridge orifice plate. Thus the print/cartridges inserted into nests 5 and 7 will print cooperatively in precise interlaced relation without any artifacts due to vertical or rotational non-alignments, relative to the print zone P, between the different print/cartridges. By this aspect of the present invention, the printer resolution is effectively doubled without the difficulties of reducing the orifice interspacing of print/cartridges.

The ink jet printer shown in FIG. 1 also includes a sub-system for the control of drop placements, horizontally (i.e. along the direction of carriage traverse), between the cooperative print/cartridges in nests 5 and 7. Such sub-system in general comprises control means for detecting and storing relative transverse location data for the orifice array of each print/cartridge and means for controlling the print drop actuation of each print-/cartridge according to its particular location data. In the FIG. 1 embodiment such detecting means comprises a print/cartridge scan detector device 60 located at a fixed position along the path of carriage traverse and carriage position detector device 70 comprised of a linear encoder strip 71 mounted along the traverse path of the carriage 4 and a strip decoder 72 attached to the carriage for movement in operative relation with the endcoder strip 71. In general, the function of the scan detector device 60 is to signal the passage of a unique print/cartridge characteristic that is indicative of the precise that print/cartridge's linear orifice array 29 as the carriage traverses the print/cartridge past the scan detector on its movement toward the print platen 2. In general, the function of the carriage position detector device 70 is to sense and signal successive instantaneous positions of the carriage 4 during its traversing movements.

Figure 10:
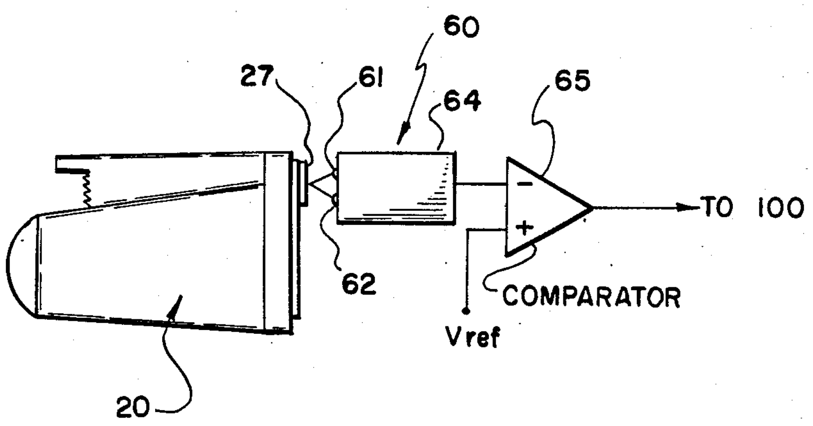
FIG. 10 is a schematic perspective view showing one means for detecting relative-transverse location of print/cartridge orifice arrays in accord with the present invention.

Referring now to FIG. 10, the scan detector device 60 comprises an infrared emitter 61, e.g. an LED, and infrared detector 62, e.g. a phototransistor, both supported in predetermined orientations and spacial relations in sensor block 64. Thus, the emitter 61 is located to direct light obliquely toward the path of a traversing print/cartridge 20 so that when an orifice plate 27 of such cartridge is in the beam of the emitter, its light is reflected by the bright nickel orifice plate metal to return to the detector 62 as shown. Other portions of the print/cartridge are formed of non-reflective material, e.g. black plastic, so that the light energy received by detector 62 during the passage of an orifice plate is significantly greater than when an orifice plate is not in the path of the emitter light beam. In this regard it is noted that the vertical edges of orifice plates, that have been properly indexed via their bottom edge, will be perpendicular to the direction of traverse. The vertical orifice plate edges are linear and have a length such that the scan detector will accurately scan detect the vertical edges of orifice plates even though vertically offset as shown in FIGS. 2 and 3.

As illustrated schematically in FIG. 10, the output of detector 62 is coupled to comparator 65; and when the detector voltage $V_D$ from the detector 62 increases above threshold voltage $V_{ref}$, the shift of comparator 65 to its low state is transmitted to the interface of a microcomputer 100. As will be described in more detail subsequently, the microcomputer interprets such signal from the comparator 65 as the passage event for a leading edge of orifice plate 27. When the print/cartridge orifice plate passes out of the beam from emitter 61, the output of comparator 65 returns to a high state signalling the microcomputer of this trailing edge passage event. One important purpose of carriage position detector 70 is to relate the leading edge/trailing edge events signalled by the scan detector 60 to the positions of the carriage along its traversing path.

Figure 9A:
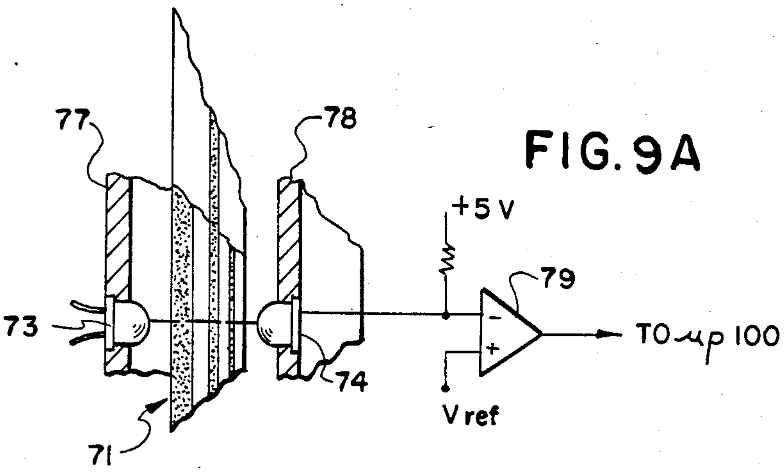
FIGS. 9 and 9B are schematic perspective views illustrating carriage position detection means in accord with one preferred embodiment of the present invention.
Figure 9B:
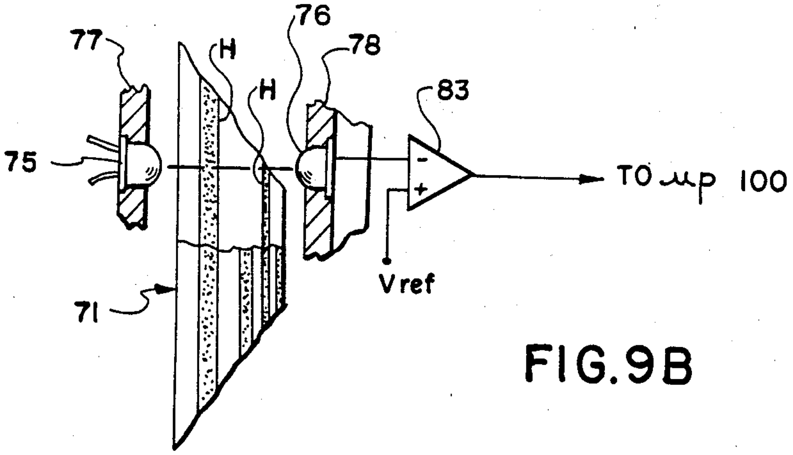

Referring now to FIGS. 9A and 9B, as well as FIG. 1, carriage position detector 70 comprises a strip decoder portion 72 which is mounted for movement with carriage 4 and which includes emitter and detector pairs 73, 74 and 75, 76. The emitters and detectors are disposed in opposing relation respectively on extensions 77, 78 of carriage 4 so as to sandwich the linear encoder strip 71 during the traversing movement of the carriage. As shown in FIG. 9A, the lower portion of the linear encoder 71 comprises a plastic strip of alternating transparent and opaque sections, e.g. each section 2.6 mils wide. Emitter-detector pair 73, 74 is arranged to pass and receive light through this lower strip portion and the power to the emitter 73 is adjusted such that the detector 74 operates in a nonlinear region. Thus, the detector 74 will output a triangular sinusoidal-like voltage waveform in response to modulation by the lower portion of strip 71. The signal from detector 74 is coupled to a comparator 79 which has a threshold voltage level $V_{ref}$ such that the output of comparator 79 changes state at the same stage of every transparent-opaque encoder transition past the detector. As shown in FIG. 9A, the pulse train produced as the output of comparator 79 is applied as separate inputs 84a and 84b to microprocessor 100 for purposes subsequently described. Emitter-detector pair 75, 76 shown in FIG. 9B is arranged to pass and receive light through the upper part of the encoder strip which has only opaque traverse location markers H. The output of detector 76 is compared by comparator 83 to $V_{ref}$ and the low output from comparator 83 signals the microcomputer 100 that the carriage has reached a certain point(s) along its printing path, e.g. a turn-around location. Further details of useful detector systems are described in U.S. application Ser. No. 946,137, entitled "System for Determining Orifice Interspacings of Cooperative Ink Jet Print/Cartridges", by Piatt, Theodoras and Ray, which is incorporated herein by reference.

Figure 11:
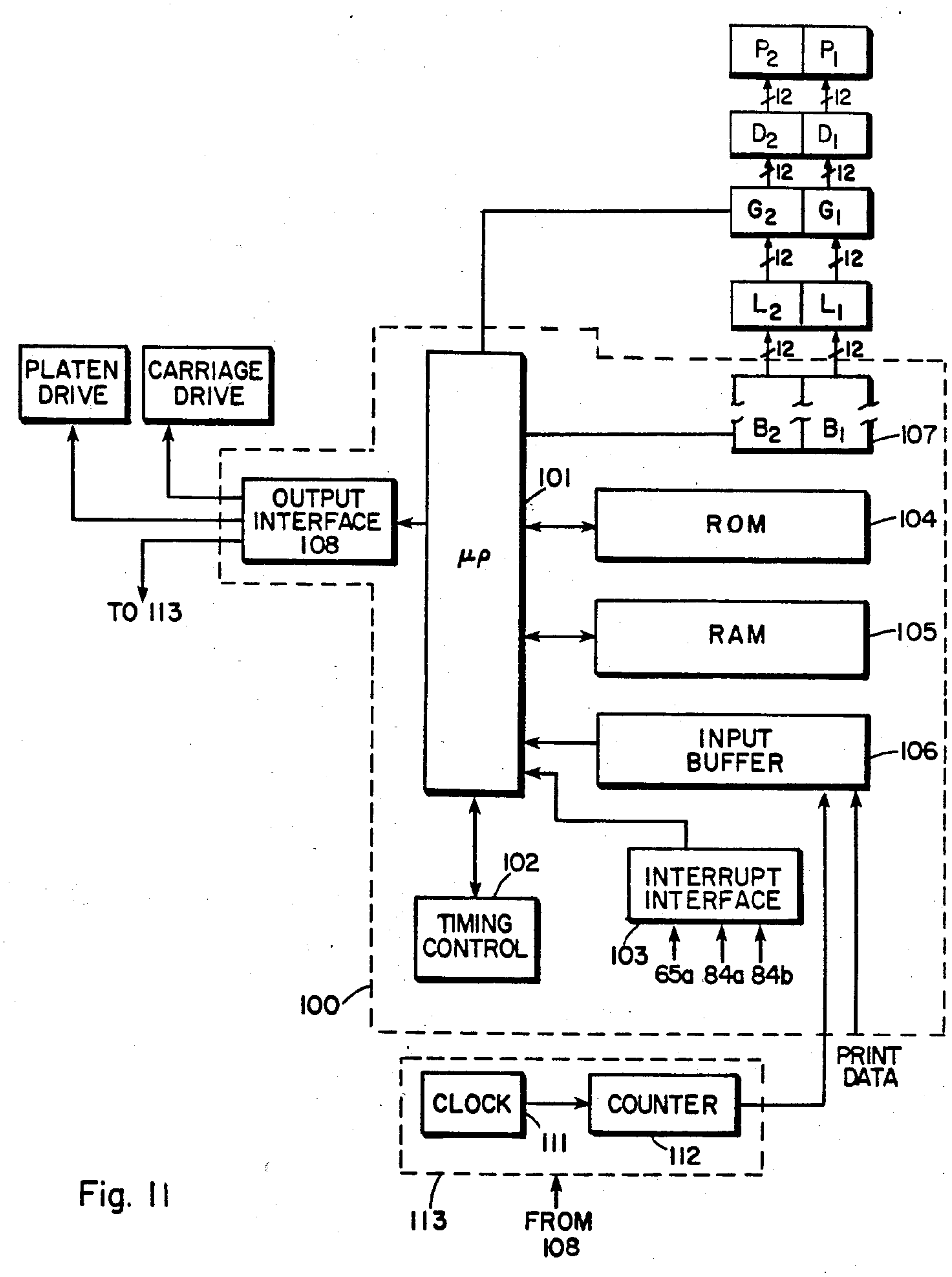
FIG. 11 is a schematic diagram illustrating one control system in accord with the present invention.

Considering the foregoing, there has been described means for detecting the passage, by corresponding portions of vertically offset print/cartridges, of a predeterminedly placed detector and means for detecting various dynamic positions of the carriage 4 along its transversing path. The cooperative functioning of these detecting means as well as the overall operation of the printer can be further understood by referring to FIG. 11–15. As shown in FIG. 11, microcomputer control system 100 comprises a microprocessor 101 with related timing control and interrupt interface sections 102, 103, cooperative read only memory (ROM) 104 and read/-write memory (RAM) 105. The system 100 also includes input and output buffer interface sections 106, 107 adapted to receive, store and output data for the microprocessor 101. The printer also includes for cooperating with its microcomputer control system 100, an input system 113, including a clock 111 and counter 112, whose function will be described subsequently.

Figure 12:
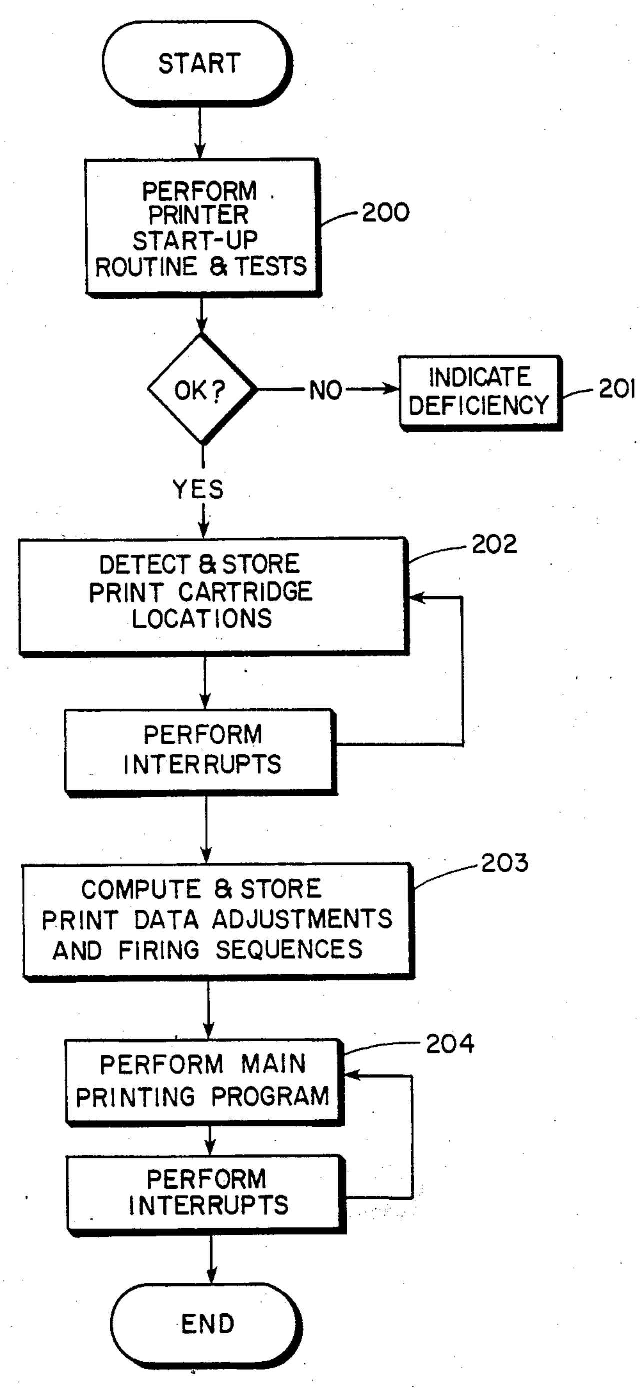
FIGS. 12–15 are flow charts useful in explaining processes performed by the FIG. 11 system.

As indicated by the general flow chart of FIG. 12, the ROM 104 contains programs whereby the microcomputer is, in general, adapted, on start-up, to perform routines such as activating paper drive and carriage drive motors, supplying energy for the print/cartridges, etc., as well as tests for the attainment of proper start-up conditions, e.g. adequate power supply, paper supply, etc. As also shown in FIG. 12, before commencing with the main printing program 204, the control system is programmed, in ROM 104, to detect and store (process 202) the locations of inserted print/cartridges and (process 203) to compute and store (i) data for adjusting the flow of print data from the output buffer 106 and (ii) data for controlling the firing sequences of inserted print/cartridges during the normal printing operations (process 204).

Figure 13:
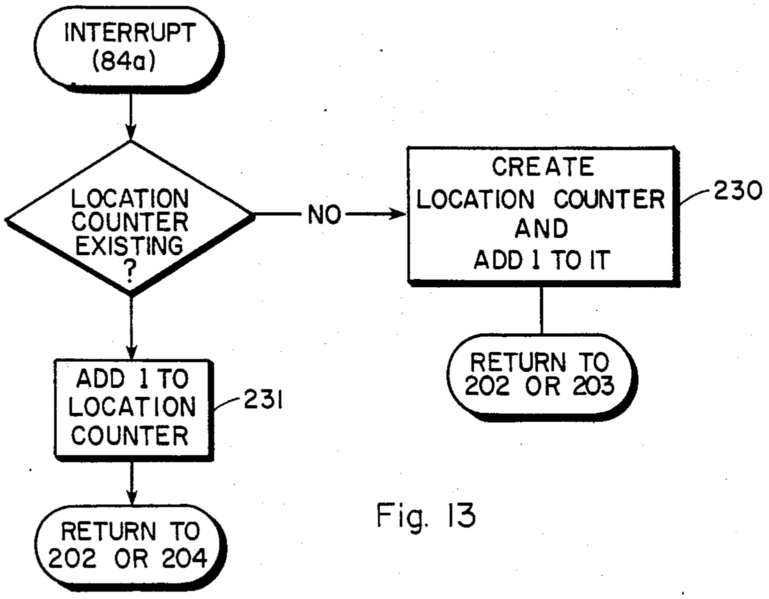

More specifically, after print/cartridges $P_1$ and $P_2$ have been inserted and properly indexed to the predetermined vertically offset relation as described above and after the start-up test routines (process 200) have been performed, the printer proceeds, under the control of a program in ROM 104, with detect and store function (process 202) as follows. The carriage drive 9 is activated to move a predetermined home station location to the left of the sensor 60 and to then traverse it from left to right past the sensor at a nominal scan speed which is slower than the traversing speed during printing. When the carriage position detector 74 initiates the first pulse from comparator 79 to interrupt port 84a of the interrupt interface 103, the procedure shown in FIG. 13 is transferred from ROM 104 to RAM 105. Thus, the interrupt signal will then effect creation of a carriage position counter (process 230) in RAM 105, input a count of "1" to that counter and return the microprocessor to other control functions. When the next pulse from comparator 79 is input at port 84a, the carriage position count will be added to by 1 (process 231) and the microprocessor again returned to other work. The sub-routine described with respect to FIG. 13 operates both in the detect and store function (process 202) and the main printing function (process 204).

Figure 14:
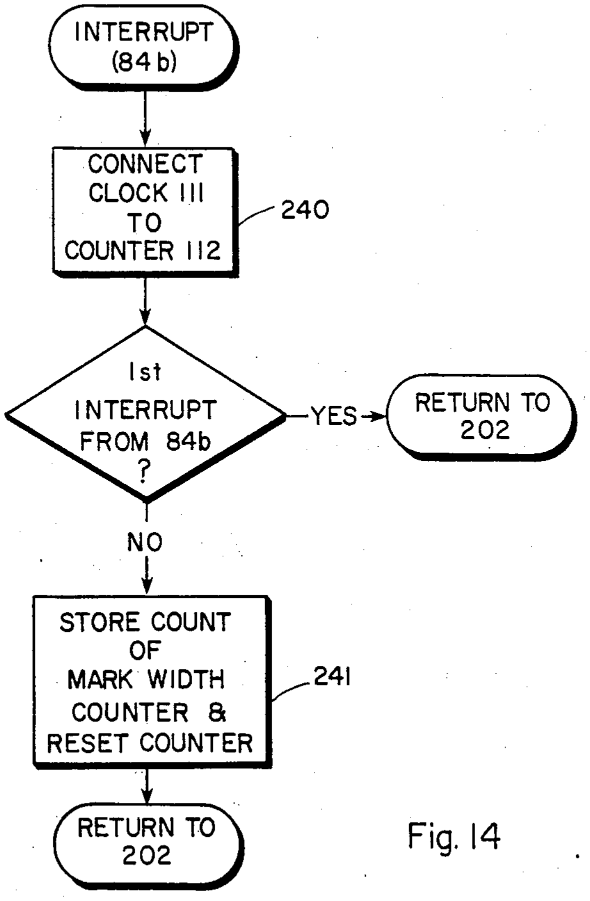

Referring now to FIG. 14, as well as FIG. 11, it can be seen that the pulse train from comparator 79 is also applied to input port 84b of interrupt interface 103. This interrupt signal connects clock 111 to counter 112 to begin producing an intra-mark count for the first encoder marking on encoder strip 71. That is, the clock 111 is selected with a frequency that divides each mark (opaque and transparent) of strip 71 into a nominal intra-mark resolution, when the carriage is moving at the nominal scan-detect speed. It should be noted that if the nominal clock speed were selected to yield 300 counts between mark transitions at the nominal carriage scan-detect speed, variations in that speed might yield an intra-mark count of 280 (if above nominal speed) or 320 (if below nominal speed). As shown in FIG. 14, after receipt of the first interrupt signal at port 84b, the counter is started and control of the microprocessor is relinquished. However, upon receipt of each subsequent 84b interrupt, a mark width count is stored and the counter is reset to "0". Thus, during the traverse of the carriage, the microcomputer has an access to (i) the dynamic intra-mark count of the mark then passing detector 74 and (ii) the entire intra-mark count of the most recently passed mark. Both these data are useful in converting the intra-mark count to intra-mark phase information in the computation process 203 to be described later.

Figure 15:
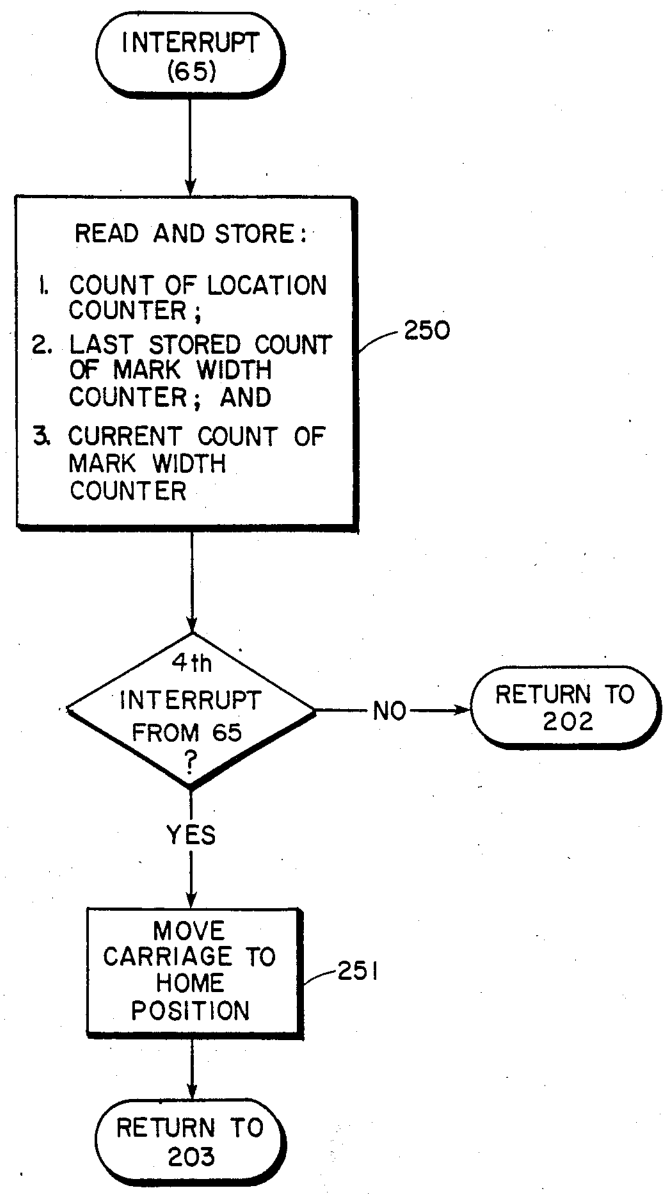

Referring next to FIG. 15, as well as FIG. 11, it can be seen that when a signal from comparator 65 of orifice plate detector 60 is supplied to interrupt port 65a of the microcomputer, a subroutine is addressed in ROM 104 which detects the microprocessor in: (i) reading and storing the mark count then stored in the carriage position counter, created and updated by the FIG. 13 subroutine, (ii) reading and storing intra-mark count of the then most recently passed mark, stored by the FIG. 14 subroutine, and (iii) reading the then existing clock count of intra-mark counter 112 (process 250).

The above-described procedures continue as the print/cartridge moves the leading and trailing vertically aligned edges of each of the print/cartridges orifice plates past sensor 60. After the 4th interrupt procedure of reading and storing orifice plate edge data (assuming a two print/cartridge printer), the carriage 4 is returned to the home position (process 251) and computations in accord with process 203 commence. In general, the process 203 is performed by microprocessor 101 under the control of a program in ROM 104, using orifice location data stored in RAM 105 as described above, and has the objective of determining and storing the precise transverse distances between the orifice arrays of print/cartridges $P_1$ and $P_2$. This determination is useful in coordinating printing with inserted print/cartridges to avoid drop placement artifacts in the transverse page direction.

The distances between the linear orifice arrays can be determined by a number of simple algorithms, based on the fact that the orifice arrays are all precisely located relative to the leading and trailing edges of their orifice plate. Several such procedures are described in concurrently filed U.S. application Ser. No. 945,137, entitled "System for Determining Orifice Interspacings of Cooperative Ink Jet Print/Cartridges" by Piatt, Theodoras and Ray. By using the intra-mark detection features described in U.S. application Ser. No. 945,138, entitled "Transverse Printing Control System for Multiple Print/Cartridge Printer" by Piatt and Ray (which is incorporated herein by reference), additional resolution information is available to even more precisely interrelate the cooperative orifice arrays in printing. One useful algorithm for attaining advantage of the intra-mark data is as follows:

1. Determine each orifice plate edge location as a mark plus phase (fractional mark count) datum by:
   (a) Dividing its current intra-mark count from counter 112 (stored by procedure 250) by the last previous full mark width count (stored by procedure 250); and
   (b) Adding the resultant fraction to the location counter count (stored by procedure 250).

2. Determine the mark count plus phase location datum of the orifice array of each print/cartridge by: (i) comparing count plus phase datum of its edges, (ii) multiplying the remainder of such comparing by a parameter representing the location of the array between the edges and (iii) adding this intra-mark fraction to leading edge location as computed by 1. above. In the following example of this process it is assumed that the array of orifices trails the leading edge of the orifice plate by 0.75 of the orifice plate transverse dimension and calculations are illustrated to identify the orifice array location precisely. However, as will become clear subsequently, in many instances only the precise inter-orifice-plate distances are utilized so that the location of a center of orifice plate symmetry (in the transverse dimension) can be utilized to determine the operative transverse spacing between corresponding portions of adjacent orifice plates rather than dealing with the actual orifice array locations.

EXAMPLE

If the location data of the first print/cartridge edges are:

Leading edge: 902 marks, 230 intra-mark counts, and last previous mark count 311

Trailing edge: 1340, 110 and last previous mark count 291, the leading edge location equals $902+(230\div 311)=902.74$ and the trailing edge location equals $1340+(110\div 291)=1340.38$ If the orifice array is located 0.75 of the orifice plate width from the leading edge, the orifice array location equals $902.74+0.75(1340.38-902.74)=1230.97$.

3. Determine the mark plus phase spacings (S) between the second print/cartridge orifice array and the first print/cartridge array, e.g.:

$$P_2=2865.74 \quad P_1=1230.97 \quad S_{1\text{-}2}=1634.77$$

These spacing data are computed and stored (process 203) and provide information useful for determining print data loading and print head firing sequence adjustments, as will become clear in view of the subsequent explanation of the modes of loading print data into output buffer 107 of the microcomputer.

Figure 16:
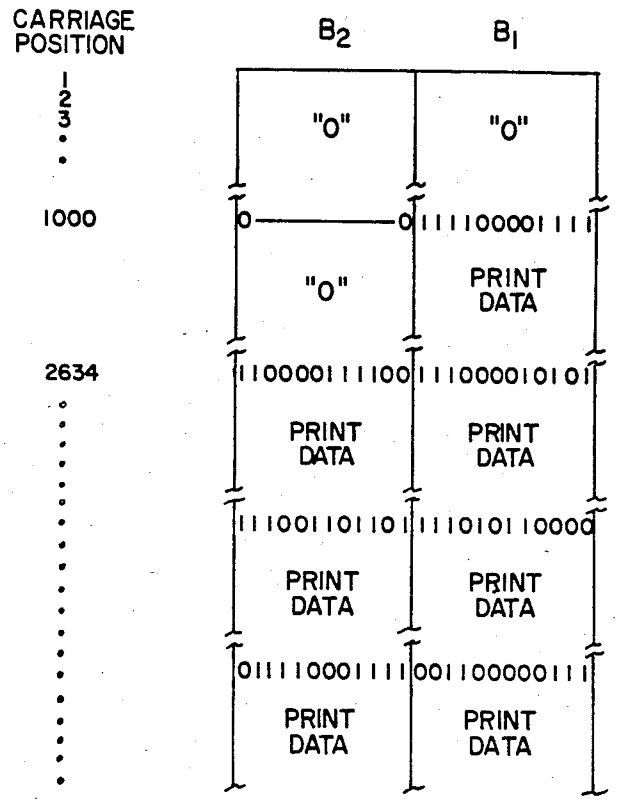
FIG. 16 is a diagram useful in explaining the operation of the present invention.

Referring now to FIGS. 11 and 16, one embodiment for effecting transverse drop placement coordination in accord with the present invention will be described. Thus, it can be seen that a buffer output memory 108 contains separate channels $B_1$ and $B_2$ respectively for receiving print data for each of the print/cartridges $P_1$ and $P_2$. In operation, the print data is received by the input buffer of microcomputer 100 and loaded into the buffers $B_1$ and $B_2$ by the microprocessor in particular sequences determined by a program in ROM 104 utilizing the orifice array location data described above, which is stored in RAM 105. More particularly, referring to FIG. 16 (in which "1" indicates a digital signal to eject an ink drop and "0" indicates a non-eject signal), it can be seen that data is loaded into buffer channel $B_1$ so that the first print signals will be ready for output from the buffer at position 1000 of the print head carriage 4. That is, this example assumes that the first possible line print position is 1001 encoder marks to the right of the home station (or start-count mark) and that the buffer is actuated to advance data in its channels one position per encoder mark. Referring again to FIG. 11, it will be seen that upon the 1001 transition pulse, latch $L_1$ is loaded with print/no-print data from buffer $B_1$ while latch $L_2$ is loaded with all 0's from their respective buffer channels. Thus, when the gates $G_1$ and $G_2$ are enabled at this print position 1001, the twelve (12) drivers for the 12 orifices of print/cartridge $P_1$ will be fired according to the "0" or "1" information in the latches $L_1$ and appropriate ink drops will be ejected to the print line by $P_1$. As shown in FIG. 16, this condition will continue until position 2634 (i.e. 1000+count spacing $S_{1\text{-}2}$ of 1634) evolves, at which time print/no-print data for print/cartridge $P_2$ will be ready for output to its latches $L_2$.

Reflecting on what has been described, it will be understood that the loading of the buffers $B_1$ and $B_2$ will accomplish a delay between the commencement of printing which has been computed and stored (as described previously—process 250) to attain accurately coordinated transverse drop placement between the print/cartridges as physically positioned. Thus, print/cartridge $P_2$ will be provided with printing information 1634 mark transitions after $P_1$. Each of the buffers will continue to output printing data to its latches until its full line of print data is completed and will thereafter output all "0's". Therefore, as would be expected, print/cartridge $P_1$ will cease printing first and $P_2$ second.

If desired, the twelve drivers for each print/cartridges can be fired sequentially (e.g. 1 to 12 or in pair sequence 1 and 6, 2 and 7, etc.). This is accomplished by the gate control signals supplied by microprocessor under the control of a sequence program in ROM 104. This can be advantageous from the viewpoints of reducing thermal and acoustic crosstalk and of reducing peak power requirements for the drivers' energy source. In addition, the program of ROM 104 desirably provides for the microprocessor's sequential enablement of each gate groups $G_1$ and $G_2$, and in this preferred mode of operation, the phase (fractional mark) spacing data that was calculated and stored (process 250) is useful. Thus, consider the spacing data calculated according to the previous example where $S_{1\text{-}2}=1634.77$. In accordance with print head firing sequence algorithm, the gate group for the first print/cartridge ($P_1$ when moving left to right) will be enabled first at each encoder transition. Thereafter, the print/cartridge firing proceeds for print/cartridge $P_2$ (phase spacing 0.77). More specifically, it is preferred in accord with the present invention that the gate $G_2$ be enabled at a particular intra-mark count after the enablement of gate $G_1$ that reflects the particular phase spacing of its related print/cartridge from print/cartridge $P_1$. This preferred procedure will accomplish drop placements from each of vertically offset print/cartridges that are precisely coordinated in the transverse dimension. That is, the drops from print-/cartridge $P_2$ will be located precisely based on the transverse pixel locations that are defined by the ink drop placements of print/cartridge $P_1$ as it is enabled and fired at each encoder transition signal, even though offset in the vertical direction therefrom. For example, considering exemplary the phase spacing information derived above, in a left-to-right printing traverse of carriage 4, the gates $G_2$ would be enabled 0.77 of the nominal 300 intra-mark counts of an encoder signal transition or 231 intra-mark counts after gates $G_1$. It will be noted that the above-described embodiment utilizes the nominal intra-mark count of 300 without any adjustment based on the intra-mark count of a next-previous encoder mark. It has been found that at the higher printing-transverse speed of the carriage 4, the mechanical system inertia is such that reliable printing drop placement can be achieved by the servo controls of the carriage drive in combination with the just-described gate enablement technique. Thus referring to FIG. 11, gates $G_1$ will be enabled by microprocessor 101 on the signal from comparator 79, and successively thereafter at counter count of 231 273 gate $G_2$ will be enabled by microprocessor 101. It should be made clear that, in addition to the sequential enablement of gate groups, the enablement of the 12 gates within each gate group can also be implemented sequentially or in pairs by a program within the microcomputer, so that at any one instant only 1 or 2 of the 48 drivers are energized. Retrace printing can be of a separate information line, or, if desired, to further increase resolution. The input of data and gating of information signals in right to left printing can be in accord with the procedures described in U.S. application Ser. No. 945,138, entitled "Transverse Printing Control System for Multiple Print/Cartridge Printer" by Piatt and Ray, which is incorporated herein by reference for those teachings.

While the illustrated embodiment comprises a construction for physically vertically interlacing two print-/cartridges, it will be understood that three or more print/cartridges could be interlaced (e.g. by providing S/3 vertical offsets for the referencing surfaces of knife edges). Also, it will be noted that even higher resolutions (e.g. 48 orifices per vertical character height can be obtained, if desired, by utilizing a further interlacing retrace mode where the print media is advanced one-fourth of the orifice center-to-center spacing.

The invention has been described in detail with particular reference to preferred embodiments thereof, but it will be understood that variations and modifications can be effected within the spirit and scope of the invention.

We claim:

1. In ink jet printing apparatus having means for feeding successive line portions of a print medium past a linear print zone, a high resolution print system comprising:

(a) a plurality of substantially identical print/cartridges each having an ink reservoir, an array of drop ejection elements and an orifice plate including: (i) an array of orifices located in a precisely interspaced relation and (ii) a detent means precisely located with respect to said orifice array;

(b) carriage means for insertably supporting said print/cartridges and for traversing them along said print zone in a direction substantially perpendicular to the direction of print medium feed; and (c) a plurality of index means, coupled to said carriage means, for respectively positioning the detent means of inserted print/cartridges at predetermined locations that are precisely vertically offset relative to the direction of carriage means traverse, whereby the printing droplets from the vertically offset orifice arrays of inserted and indexed print-/cartridges will be vertically interlaced in each printing traverse of said carriage.

2. The invention defined in claim 1 wherein the orifices of each print/cartridge are located in a linear array with an identical center-to-center spacing S and wherein said index means are vertically offset by an amount S/n where n is the number of print/cartridges supported on said carriage means.

3. The invention defined in claim 1 wherein said system comprises two inserted print/cartridges, each having substantially identical orifice plates comprising linear orifice arrays with center-to-center spacings S and wherein said index means are vertically offset by the distance S/2 relative to the direction of traverse.

4. The invention defined in claim 1 wherein said detent means comprises linear edge portions of said orifice plates and said index means comprises linear knife edge portions adapted to abut said linear orifice plate edges.

5. The invention defined in claim 4 wherein said linear orifice arrays are perpendicular to said detent edges and said knife edges are precisely parallel to the direction of carriage means traverse.

6. The invention defined in claim 5 wherein said knife edges are vertically offset in the direction of the line of positioned orifice arrays.

7. The invention defined in claim 6 wherein said indexing means include means for fastening said print-/cartridges with their detent means in engagement with respective knife edge portions.

8. In ink jet printing apparatus of the type having feed means for advancing successive line portions of a print medium past a linear print zone, a system for printing with a plurality of removable print/cartridge having identical orifice plates with a detent surface precisely located relative to a linear orifice array, said system comprising:

(a) a carriage means constructed to traverse horizontally across said print zone in a predetermined direction and insertably receive a plurality of such print/cartridges;

(b) a plurality of referencing surfaces on said carriage means, said surfaces being parallel to said predetermined direction and precisely offset relative to one another in the vertical print zone direction; and (c) fastening means for moving the detent surfaces of received print/cartridges into precise detent relations with respective referencing surfaces of said carriage means.

9. The invention defined in claim 8 wherein said carriage means includes a plurality of nest means for supporting respectively received print/cartridges in a coarsely located position with the detent surfaces of received print/cartridges spaced from said referencing surfaces and cam means for moving received print/cartridges into said precise detent relations.

10. The invention defined in claim 8 wherein said referencing surfaces comprise knife edge portions adapted to engage respective edge surfaces of the orifice plates of received print/cartridges.

11. In ink jet printing apparatus of the kind which includes means for advancing a print medium along a feed path so that successive line portions move sequentially past a linear print zone and which is adapted for use with a plurality of substantially identical print/cartridges of the type including an ink reservoir, drop generator elements, electrical leads to such elements, detent means and an orifice plate having a linear array of orifices aligned with respective drop generator elements and predeterminedly located relative to said detent means, an interface construction for accurately positioning such print/cartridges for cooperative printing and comprising:

(a) carriage means for receiving such print/cartridges, including a plurality of integral support means mounted for movement in a traversing direction adjacent said linear print zone;

(b) a plurality of referencing surfaces, each constructed on said carriage means in alignment with a respective support means, said referencing surfaces being constructed to cooperate with detent means received print/cartridges and index respective orifice arrays in a vertically interlaced relation relative to the direction of carriage means traverse; and (c) indexing means for urging received print/cartridges into a condition wherein their detent means are indexed to respective referencing surfaces.

12. In ink jet printing apparatus of the kind which includes means for advancing a print medium along a feed path so that successive line portions move sequentially past a linear print zone and which is adapted for use with two identical print/cartridges of the type including an ink reservoir, drop generator elements, electrical leads to such elements and an orifice plate having a detent means and a linear array of uniformly spaced orifices aligned with respective drop generator elements, a print/cartridges interface construction for accurately positioning such print/cartridges for interlaced printing comprising;

(a) a pair of support means, each mounted for movement in a traversing direction adjacent said linear print zone, for receiving such print/cartridges;

(b) a pair of referencing surfaces, each constructed for traversing movement with a respective print-/cartridge support means, said referencing surfaces being parallel to the direction of support means traverse and vertically offset by one-half of an orifice interspace;

(c) a pair of terminal means each constructed for traversing movement with a respective print/cartridge support means; and (d) indexing means for urging received print/cartridges into a condition wherein the detent means of its orifice plate is indexed to the referencing surface on its receiving support means and its electrical leads are operatively coupled to respective terminal means.

13. The invention defined in claim 12 wherein said referencing surfaces comprise knife edges and said support means each include movable means for (i) holding a received print/cartridge with its orifice plate above said edges and (ii) moving to allow engagement between an edge of the print/cartridge orifice plate and said knife edges.

14. The invention defined in claim 12 further comprising means for detecting and storing the relative transverse locations of indexed orifice arrays and means for controlling the printing actuations of each indexed print head in accordance with its detected transverse location, whereby the drop placements of such indexed print heads are accurately interrelated within the line commonly printed thereby.

15. In ink jet printing apparatus having means for feeding successive line portions of a print medium past a linear print zone and adapted for use with a plurality of substantially identical print/cartridges each having an ink reservoir, an array of drop ejection elements and an orifice plate including: (i) an array of orifices located in a precisely interspaced relation and (ii) a detent means precisely located with respect to said orifice array, a high resolution printer comprising:

(a) carriage means for insertably supporting such print/cartridges and for traversing them along said print zone in a direction substantially perpendicular to the direction of print medium feed; and (b) a plurality of index means, coupled to said carriage means, for respectively positioning the detent means of inserted print/cartridges at predetermined locations that are precisely vertically offset relative to the direction of carriage means traverse, whereby the printing droplets from the vertically offset orifice arrays of inserted and indexed print/cartridges will be vertically interlaced in each printing traverse of said carriage.

16. The invention defined in claim 15 wherein the orifices of such print/cartridges are located in a linear array with an identical center-to-center spacing S and wherein said index means are vertically offset by an amount S/n where n is the number of supporting means on said carriage means.

17. The invention defined in claim 15 wherein such detent means comprises linear orifice plate edge portions and said index means comprises linear knife edge portions adapted to abut such linear orifice plate edges.

18. The invention defined in claim 17 wherein such linear orifice arrays are perpendicular to such detent edges and knife edges are precisely parallel to the direction of carriage means traverse.

19. The invention defined in claim 18 wherein said knife edges are vertically offset in the direction of the line of positioned orifice arrays.

20. The invention defined in claim 19 wherein said indexing means includes means for fastening such print-/cartridges with their detent means in engagement with respective knife edge portions.

* * * * *